United States Patent

Kilby et al.

[15] 3,696,411

[45] Oct. 3, 1972

[54] KEYBOARD ENCODER

[72] Inventors: Jack S. Kilby; James H. Van Tassel, both of Dallas, Tex.

[73] Assignee: Texas Instruments Incorporated, Dallas, Tex.

[22] Filed: Nov. 12, 1970

[21] Appl. No.: 89,016

Related U.S. Application Data

[63] Continuation of Ser. No. 671,805, Sept. 29, 1967, abandoned.

[52] U.S. Cl...............340/365, 340/347 DD, 200/5 A

[58] Field of Search...........340/347 DD, 365; 178/18

[56] References Cited

UNITED STATES PATENTS 2,932,816 4/1960 Stiefel.................340/347 DD

*Primary Examiner*—Maynard R. Wilbur
*Assistant Examiner*—Jeremiah Glassman
*Attorney*—Samuel M. Mims, Jr., James O. Dixon, Andrew M. Hassell, Harold Levine, Melvin Sharp, Gerlad B. Epstein and John E. Vandigriff

[57] ABSTRACT

Disclosed is a keyboard encoder capable of directly encoding decimal input information into electrical binary code. The electrical encoding of the information appears at the output terminals of the encoder when the key representing the information to be encoded is depressed. The depressed key causes the selective shorting together of certain ones of a group of encoding conductors which are connected to the output terminals.

7 Claims, 4 Drawing Figures

JACK S. KILLEY
JAMES H. VAN TASSEL
INVENTORS

BY Melvin Sharp
ATTORNEY

KEYBOARD ENCODER

This application is a continuation of Ser. No. 671,805, filed Sept. 29, 1967 now abandoned.

The present invention relates to information encoders and more particularly to keyboard information encoders for use with electronic calculators.

An object of the present invention is to provide a small, inexpensive and reliable high speed keyboard encoder of simple construction.

Another object of the present invention is to provide a keyboard encoder for miniature electronic calculators capable of directly encoding input information into the electrical codes used by the calculators.

Other objects, features and advantages of the invention may be best understood by reference to the following detailed description when read in conjunction with the accompanying drawings in which like reference numerals indicate like parts and in which.

Figure 1:
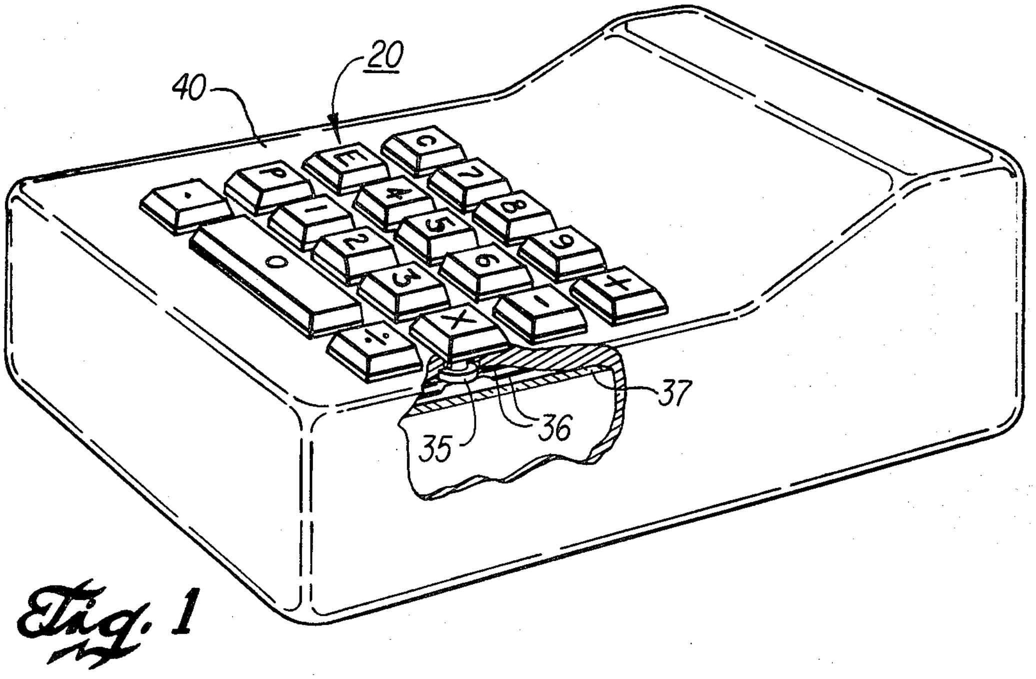
FIG. 1 illustrates an arrangement of input keys according to the present invention mounted in the case of a miniature electronic calculator.

Referring to FIG. 1, a miniature electronic calculator is shown which is capable of addition, subtraction, multiplication, division, error correction, register clear, print out and decimal placement. The keys of the keyboard switch are mounted in the case 40 of the calculator and each key has inscribed upon it a symbol representing the control or numeric input effected by depressing that key. A strip of conductive material forming a shorting strip 35 is attached to the bottom of each key. Inside the calculator case and parallel to the plane of the keys, is a keyboard 37 having a flat upper surface with conductors 36 disposed thereon. The conductors 36 are disposed on the keyboard beneath the keys in such a pattern that the shorting strip 35 of each key will short together certain combinations of the conductors when the key is depressed.

Figure 2:
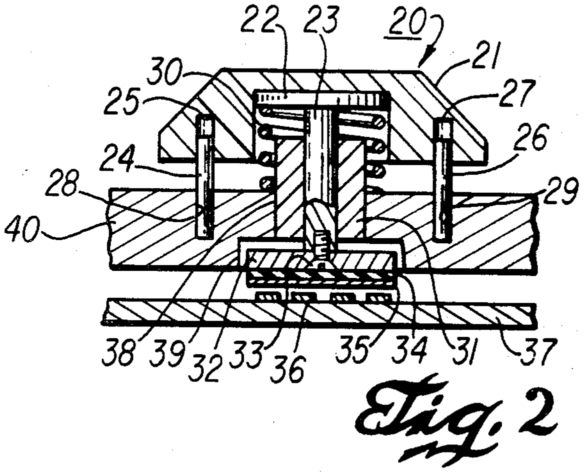
FIG. 2 illustrates a key and associated portion of the keyboard of the embodiment of FIG. 1.

Referring now to FIG. 2, the encoding keys 20 are set into holes in a support board 40. In the embodiment shown the support board is part of the calculator case. Each hole is made up of two sections of unequal diameters, with the larger diameter section 39 extending approximately one-third of the way up through the board from its bottom surface. The smaller diameter section 38 extends from the top of the larger diameter section 39 the rest of the way through the support board 40. Cylindrical bearing 31 is fitted into the smaller diameter section 38 with one end flush with the top of the larger hole section 39 and the other end extending above the support board surface.

A key shaft 23 is fitted to slide in each bearing 31. Affixed to the top of each key shaft 23 is a key shaft head 22 of larger diameter than the key shaft. The key cap 21, having a recessed bottom region fitted over the shaft 23 and the shaft head 22, is affixed to the shaft head.

The key cap 21 has two guide holes 25 and 27 in its bottom surface. Corresponding to these guide holes 25 and 27 of the key cap 21 are anchor holes 28 and 29 in the support board 40. Guide pins 24 and 26 are fixed in the anchor holes 28 and 29 and slide in the guide holes 25 and 27 of the key cap 21. The guide pins prevent rotational movement of the key in the cylindrical bearing 31.

A shaft base 32 is attached to the bottom of each key shaft 23 by a screw 33. The base 32 is of larger diameter than the shaft 23, and is sized to fit into the larger diameter section 39 of the key hole in the support board 40 when the key 20 is in the raised position. Attached to the underside of the base 32 is a pad of resilient material 34 such as double coated foam tape No. 4032 made by Minnesota Mining and Manufacturing Company. A thin, for example 1 mil, gold-plated copper shorting strip 35 is affixed to the bottom of the resilient pad 34.

A helix spring 30 for biasing each key 20 in a raised position is fitted over each bearing 31 and key shaft 23. The bottom end of the spring 30 rests on the support board 40 and the upper end contacts the under surface of the shafthead 22. The spring is thus compressed when the key 20 is depressed.

Figure 3:
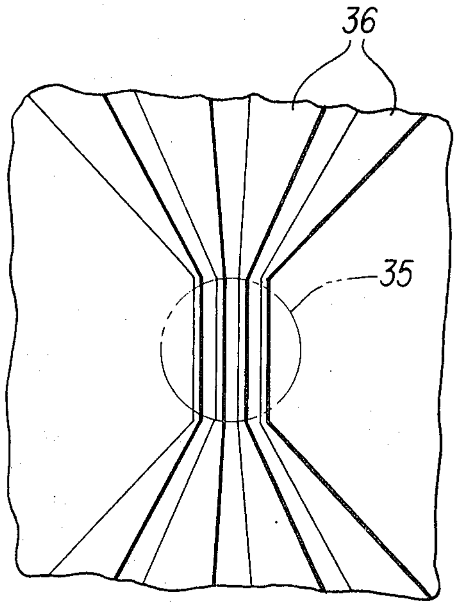
FIG. 3 illustrates the keyboard conductor circuit beneath the input key of FIG. 2.

Referring now to FIG. 3, a portion of the keyboard 37 beneath the input key of FIG. 2 is illustrated. The circular section indicated is that section of the keyboard 37 which is beneath the shorting strip 35 of the key. The figure is typical of the regions below all the keys. In these regions the conductors 36 are much narrower than on the rest of the keyboard and are grouped close together to insure that they are contacted simultaneously by the shorting strip 35 when the key is depressed. The resilient pads 34 to which the thin shorting strip 35 are attached also enhance simultaneity of contact by allowing the shorting strips 35 to permanently deform to fit variations in the thickness of the conductors 36.

Figure 4:
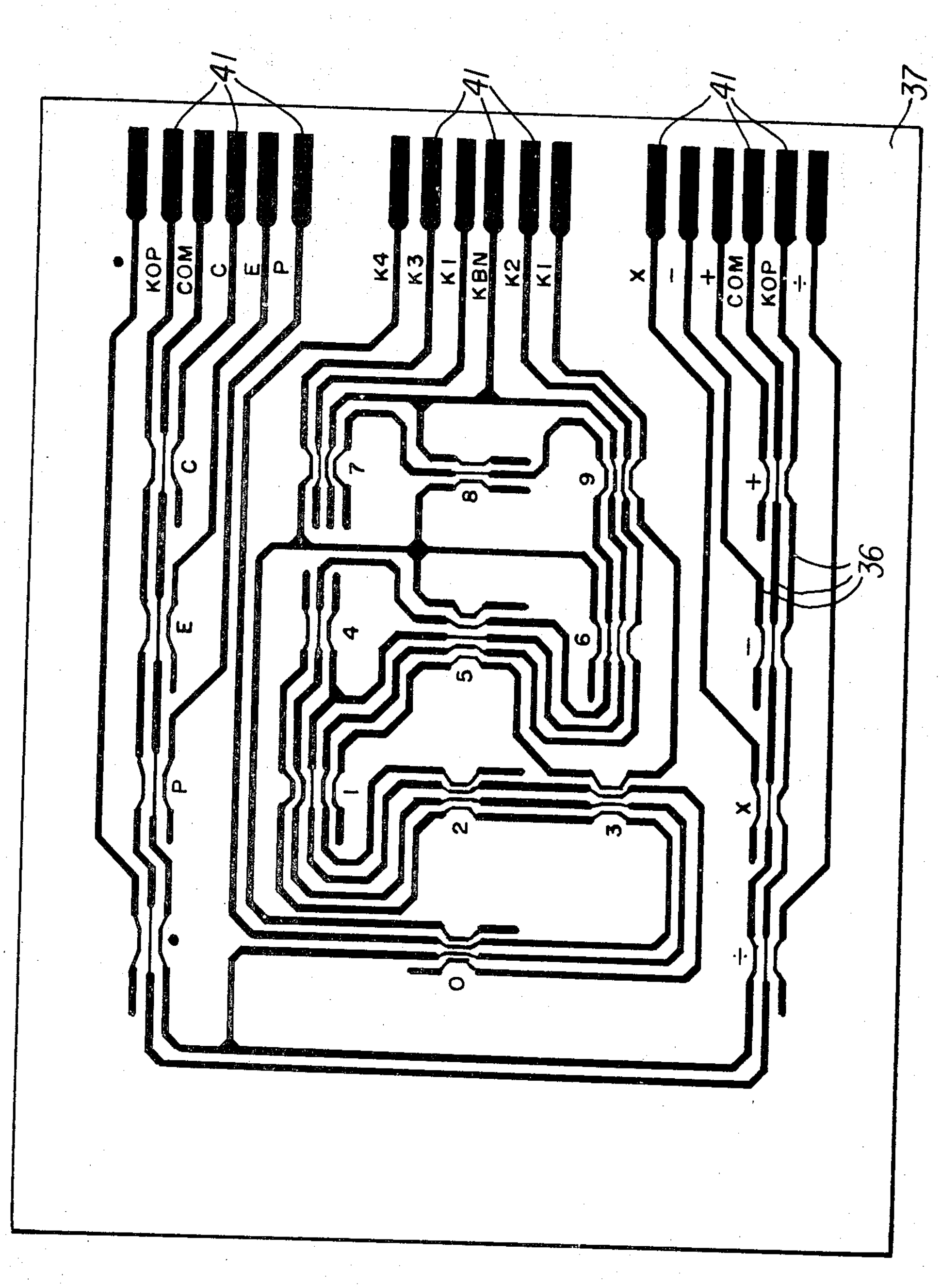
FIG. 4 illustrates one embodiment of the keyboard conductor circuit according to the present invention.

Referring to FIG. 4, the keyboard is a printed circuit board with the gold-plated copper conductors 36 upon it. The conductors are connected to output terminals 41 for connection with the calculator input circuits.

To encode information, the key 20 which has the desired information inscribed on its key cap 21 is depressed. The shaft 23 moves downward in the bearing 31 and the helix spring 30 is compressed between the shaft head 22 and the support board 40. With the key 20 depressed, the gold-plated copper shorting strip 35 attached to the key 20 contacts those conductors 36 which are beneath it and shorts them together. The shorting of these conductors 36 forms electrical connections between certain of the output terminals 41. The combinations of connected and unconnected output terminals 41 are the input to the machine with which the keyboard encoder is used. The conductors 36 and output terminals 41 can be so disposed on the keyboard 37 that the combinations of shorted and unshorted output terminals 41 are direct encodings of the input information into the internal electrical code of an electronic calculator.

When pressure on the key 20 is released the helix spring 30 forces the key back into the raised position and the contact between the strip 35 and the conductors 36 is broken. The output terminals 41 are thus returned to the "no information" state and the next item of information may be entered.

The keyboard circuit configuration of FIG. 4 is for use with the calculator of FIG. 1. The conductors 36 which are shorted together by depressing a given key 20 are indicated at the point of contact in FIG. 4 by the symbol of that key. For example, depressing the key of FIG. 1 which has the numeric symbol 2 inscribed on it causes the four conductors which have the symbol 2 associated with them in FIG. 4 to be shorted together at that point. The circuit shown encodes the numerical input information from the keys directly into a binary-decimal excess 3 code. A common potential conductor designated COM is used and all shorts are made to it so that a potential change to the common potential is noted in those conductors affected. It is this change which is the encoded information. Four of the output terminals 41, $K_1$, $K_2$, $K_3$ and $K_4$, represent the four binary bits required for a decimal binary excess 3 code while the other output terminals encode control information or identify the type of information being entered. For example, the four conductors associated with the numeric entry 2 are the KBN conductor, indicating that a numeric key is being depressed, the $K_4$ and $K_2$ conductors indicating that the second and fourth binary place digits are to be zeros, and the COM conductor. The complete code is given in Table I below:

TABLE I

| Key Depressed | Terminals Shorted |
|---|---|
| 0 | KBN, K4, K3, COM |
| 1 | KBN, K3, K2, K1, COM |
| 2 | KBN, K4, K2, COM |
| 3 | K4, K1, COM |
| 4 | KBN, K4, COM |
| 5 | KBN, K3, K2, K1, COM |
| 6 | KBN, K3, K2, COM |
| 7 | KBN, K3, K1, COM |
| 8 | KBN, K3, COM |
| 9 | KBN, K1, K2, COM |
| . | KOP,., COM |
| P | KOP, P, COM |
| E | KOP, E, COM |
| C | KOP, C, COM |
| | KOP, , COM |
| x | KOP, x, COM |
| − | KOP, −, COM |
| + | KOP, +, COM |

It is to be noted that the circuit board of FIG. 4 can be set up in coding schemes other than that shown in order to accommodate the coding scheme or internal logic of the device with which the keyboard encoder is being used. The use of the present invention as an encoder for miniature electronic calculators is more fully discussed in the co-pending patent application, Ser. No. 671,777, entitled "Miniature Electronic Calculator" by Kilby et al, filed on even date herewith and assigned to he assignee of the present application.

Other modifications in the use of the invention can also be made. For example, while the circuit shown in FIG. 4 is an arrangement for sequential input, one key at a time being depressed, the circuits and keyboard can also be arranged to allow parallel input and encoding of information.

More information identification keys can also be added and several types and items of information assigned to each input key. The proper information identification key is then depressed to indicate to he machine using the keyboard which of the types or pieces of information represented by a key or keys is intended when the key or keys are depressed.

It is also to be noted that although output terminals 41 of FIG. 4 are shown all on one side of the circuit board, they can be placed wherever necessary on the circuit board to more easily fit into the various designs of the machines with which the keyboard encoder can be used.

The disposition of the shorting strips 35 can also be changed. The shorting strips 35 can be separate from the keys 20 and normally biased between the keys 20 and the conductors 36. A depressed key 20 contacts a shorting strip 35 or the biasing means and causes the shorting strip to contact and short together the conductors 36. As one example of such an embodiment the shorting strips 35 can be disposed upon a flexible mylar film which is fixed in a plane parallel to and just above the plane of the conductors 36 and below the keys 20.

It is to be understood that the above-described embodiments are merely illustrative of the invention. Numerous other arrangements may be devised by those skilled in the art without departing from the spirit and scope of the invention as defined by the appended claims.

What is claimed is:

1. A keyboard encoder comprising in combination:

a. a support board having a substantially planar area and a substantially planar support member positioned in substantially parallel relation with said support board;

b. a plurality of spaced electrically conductive strip conductors selectively arranged in co-planar relationship and secured to one major surface of said support member in an encoding pattern said strip conductors having reference and bias potentials selectively coupled thereto;

c. a plurality of spaced keys moveably positioned on said support board within said planar area transverse thereto, said key being independently moveable into selective contact with said strip conductors on said support member for selectively engaging a preselected number of said strip conductors and having a designation according to a first code;

d. a plurality of electrically conductive shorting conductors respectively secured to the ends of said keys; and e. a plurality of biasing means respectively coupled to said keys and support board for respectively biasing said shorting conductors out of contact with said strip conductors; wherein f. selective activation of said keys causes said respective shorting conductor to selectively contact said strip conductors and produces a signal representative of the designation of the selected key according to a second code.

2. A keyboard encoder comprising in combination:

a. a support board having a substantially planar area and a substantially planar support member rigidly positioned below said support board in substantially parallel relation therewith;

b. a plurality of spaced keys slidably mounted on said support board within said planar area for independent movement transverse to the plane of said support board, said keys having a designation according to a first code;

c. a plurality of spaced electrically conductive strip conductors selectively arranged in co-planar relationship on and secured to one major surface of said support member according to a second code said strip conductors having reference and bias potentials selectively coupled thereto;

d. a plurality of electrically conductive shorting conductors resiliently secured to the lower ends of a respective one of said keys; and e. a plurality of biasing means respectively coupled to said keys and said support board for respectively biasing said shorting conductors out of contact with said strip conductors; wherein f. selective activation of said keys causes the respective shorting conductor to selectively contact said strip conductors and produces a signal representative of the designation of the selected key according to said second code.

3. A keyboard encoder comprising:

a. a support board having a substantially planar area with apertures formed therein;

b. a plurality of spaced, non-locking keys positioned in said apertures transverse to said support board, each of said keys having a portion thereof extending through said support within said planar area and a designation thereon according to a first code;

c. a plurality of electrically conductive shorting members respectively affixed to the lower ends of said keys;

d. a substantially planar support member rigidly positioned below said support board in substantially parallel relation therewith and spaced from said keys;

e. a plurality of electrically conductive strip members disposed substantially in a common plane on and secured to one major surface of said support member beneath said shorting members, and having reference and bias potentials selectively coupled thereto; said strip members being grouped into a number of encoding combinations indicative of a second code; and f. bias control means respectively coupled to said keys for respectively biasing said shorting members out of contact with said strip members; wherein g. the selective activation of said keys causes the shorting member affixed to said activated key to short together the strip members of a selected encoding combination in said number of encoding combinations and thereby produce a signal representative of the designation of said activated key in accordance with said second code.

4. The keyboard encoder of claim 3 and further including deformable resilient members interposed between said lower ends of said keys and said shorting members, wherein each of said shorting members are permanently deformed to variations in level of their respective strip member.

5. The keyboard encoder of claim 4 in which said deformable resilient means is a pad of resilient material.

6. The keyboard encoder of claim 3 wherein said strip members which are grouped into said number of encoding combinations are relatively narrow and close together in regions on said support member in which they are shorted together by said shorting members.

7. A binary decimal encoder comprising in combination:

a. a support board having a substantially planar area and apertures formed therein;

b. 10 moveable non-locking keys positioned in said support board within said planar area transverse thereto, and representing the 10 decimal digits 0–9, each of said keys comprising a shaft portion respectively extending through said apertures above and below said support board;

c. a key tap secured to the top of said shaft;

d. a pad of resilient material attached to the bottom of said shaft;

e. a thin electrically conductive metal shorting strip attached to the bottom of said pad and permanently deformed against said pad;

f. a substantially planar insulating substrate mounted below and in a plane substantially parallel to said support board;

g. five electrically conductive members disposed upon and secured to the upper surface of said substrate facing said support board and said shorting strips and having a reference voltage and bias voltages selectively coupled thereto, one of said conductive members being a common conductor and lying beneath all ten of said metal strips, the remaining four of said conductive members electrically representing the four binary places required to represent the decimal digits 0–9, each one of said four conductive members lying beneath the strips attached to those keys representing the decimal digits requiring a 0 binary digit in the binary place represented by said one of said four conductors; and h. biasing means respectively coupled to said keys for respectively biasing said conductive metal strips out of contact with said conductive members; wherein i. selective depressing of said keys causes the metal strip attached to said selected key to short together the conductive members of said five conductors which lie beneath the conductive strip of said selected key to produce a signal indicative of the designation of the decimal digit represented by said selected key in accordance with the binary code.

* * * * *